US012528670B2

(12) United States Patent
Fan (10) Patent No.: US 12,528,670 B2
(45) Date of Patent: Jan. 20, 2026

(54) METHOD AND APPARATUS FOR SETTING STATE OF SCENARIO DETECTION MODULE OF ESCALATOR

(71) Applicant: KONE CORPORATION, Helsinki (FI)

(72) Inventor: Jinquan Fan, Jiangsu (CN)

(73) Assignee: KONE Corporation, Helsinki (FI)

( * ) Notice: Subject to any disclaimer, the term of this patent is extended or adjusted under 35 U.S.C. 154(b) by 244 days.

(21) Appl. No.: 18/266,503

(22) PCT Filed: Dec. 8, 2021

(86) PCT No.: PCT/CN2021/136376
§ 371 (c)(1),
(2) Date: Jun. 9, 2023

(87) PCT Pub. No.: WO2022/121933
PCT Pub. Date: Jun. 16, 2022

(65) Prior Publication Data
US 2024/0043245 A1   Feb. 8, 2024

(30) Foreign Application Priority Data
Dec. 10, 2020   (CN) .................. 202011456945.6

(51) Int. Cl.
*B66B 29/00*  (2006.01)
*B66B 25/00*  (2006.01)
*G06V 10/70*  (2022.01)
*G06V 20/52*  (2022.01)
*H04N 7/18*   (2006.01)

(52) U.S. Cl.
CPC .......... *B66B 29/005* (2013.01); *B66B 25/006* (2013.01); *G06V 10/87* (2022.01); *G06V 20/52* (2022.01); *H04N 7/181* (2013.01)

(58) Field of Classification Search
CPC .... B66B 25/006; B66B 29/005; H04N 7/181; G06V 10/87; G06V 20/52
See application file for complete search history.

(56) References Cited

U.S. PATENT DOCUMENTS

2019/0270616 A1*  9/2019  Kikuchi ............... B66B 21/025
2020/0402379 A1   12/2020  Zhou et al.

FOREIGN PATENT DOCUMENTS

| CN | 1658870 A | 8/2005 |
|---|---|---|
| CN | 101695983 A | 4/2010 |
| CN | 108460362 A | 8/2018 |
| CN | 110135258 A | 8/2019 |
| CN | 209259461 U | 8/2019 |
| CN | 110312057 A | 10/2019 |

(Continued)

*Primary Examiner* — On S Mung
(74) *Attorney, Agent, or Firm* — Birch, Stewart, Kolasch & Birch, LLP (57) ABSTRACT

A method for setting the state of a scenario detection module of an escalator includes: acquiring running direction information of an escalator; and according to at least the running direction information, setting the states of the scenario detection modules $U_1, U_2, \ldots, U_N$ in a scenario detection module set U for the escalator to be activated or disabled. The computing capability required for scenario detection of the escalator can be lowered.

14 Claims, 4 Drawing Sheets

(56) References Cited

FOREIGN PATENT DOCUMENTS

| | | |
|---|---|---|
| CN | 111083443 A | 4/2020 |
| CN | 111652889 A | 9/2020 |
| CN | 112645201 A | 4/2021 |
| JP | 2017-61377 A | 3/2017 |

* cited by examiner

METHOD AND APPARATUS FOR SETTING STATE OF SCENARIO DETECTION MODULE OF ESCALATOR

CROSS-REFERENCE TO RELATED APPLICATION

The present application claims the priority of Chinese Patent Application No. 202011456945.6 filed on Dec. 10, 2020, and the disclosure of the above-mentioned Chinese Patent Application is hereby incorporated entirely as a part of the present application.

TECHNICAL FIELD

The present disclosure relates to a method and apparatus for setting a state of a scenario detection module for an escalator, a system for scenario detection of an escalator, a device for setting the state of a scenario detection module for an escalator, a computer-readable storage medium and a computer program product.

BACKGROUND

Escalators are essential devices in daily life scenarios (such as subway stations, stations, shopping malls, office buildings, etc.), and in order to avoid escalator safety accidents as much as possible, various scenario detection modules are used for safety monitoring or warning of the escalators.

SUMMARY

An aspect of the present disclosure provides a method for setting the state of the scenario detection module for an escalator. The method comprises: acquiring a running direction information of the escalator; and setting the state of the scenario detection module of a set of scenario detection modules for the escalator as activated or disabled according to at least the running direction information.

Optionally, the setting the state of the scenario detection module of a set of scenario detection modules for the escalator as activated or disabled according to at least the running direction information may comprise: setting the state of the scenario detection module of a first subset of the set of scenario detection modules according to the running direction information and a monitoring position information of a monitoring apparatus associated with the set of scenario detection modules.

Optionally, the setting the state of the scenario detection module of a set of scenario detection modules for the escalator as activated or disabled according to at least the running direction information comprises: setting the state of the scenario detection module of a second subset of the set of scenario detection modules according to the running direction information, a monitoring position information of a monitoring apparatus associated with the set of scenario detection module and an environment information of the escalator.

Optionally, the method may further comprises acquiring an updated running direction information; and resetting the state of the scenario detection module of the set of scenario detection modules for the escalator as activated or disabled according to at least the updated running direction information when the updated running direction information indicates that a running direction of the escalator changes.

Optionally, acquiring the running direction information comprises acquiring the running direction information from a cloud device associated with the escalator, and the running direction information is read from a local control device of the escalator by a data transmission apparatus and then transmitted to the cloud device.

Optionally, the monitoring apparatus is an image capturing apparatus.

Another aspect of the present disclosure provides an apparatus for setting a state of a scenario detection module for an escalator. The apparatus may comprise acquisition unit, configured to acquire a running direction information of the escalator; and state setting unit, configured to set the state of the scenario detection module of the set of scenario detection modules for the escalator as activated or disabled according to at least the running direction information.

Optionally, the state setting unit is further configured to set the state of the scenario detection module of a first subset of the set of scenario detection modules according to the running direction information and a monitoring position information of a monitoring apparatus associated with the set of scenario detection module.

Optionally, the state setting unit is further configured to set the state of the scenario detection module of a second subset of the set of scenario detection modules according to the running direction information, a monitoring position information of a monitoring apparatus associated with the set of scenario detection module and an environment information of the escalator.

Optionally, the state setting unit is further configured to acquire updated running direction information and reset the state of the scenario detection module of the set of scenario detection modules for the escalator as activated or disabled according to at least the updated running direction information when the updated running direction information indicates that a running direction of the escalator changes.

Another aspect of the present disclosure provides a system for scenario detection of an escalator. The system may comprise the apparatus for setting the state of the scenario detection module for an escalator as described above and the monitoring apparatus associated with the set of scenario detection modules and used to execute the scenario detection module.

Another aspect of the present disclosure provides a device for setting the state of the scenario detection module for an escalator. The device may include a processor; and a memory, storing a computer executable program thereon that when executed by the processor causes the device to perform the method for setting the state of the scenario detection module for the escalator as described above.

Another aspect of the present disclosure provides a computer readable storage medium storing a computer instruction thereon that when executed by a processor performs the method for setting the state of the scenario detection module for an escalator as described above.

Another aspect of the present disclosure provides a computer program product storing a computer instruction thereon that when executed by a processor perform the method for setting the state of the scenario detection module for an escalator as described above.

BRIEF DESCRIPTION OF DRAWINGS

In order to more clearly explain the technical solution of embodiments of the present disclosure, the following drawings will be briefly introduced. Obviously, the drawings described below only relate to some embodiments of the present disclosure and are not limited to the present disclosure.

DETAILED DESCRIPTION

The present disclosure will be described in detail below with reference to exemplary embodiments thereof. However, the present disclosure is not limited to the embodiments described here, and it can be implemented in many different forms. The described embodiments are only used to make the present disclosure thorough and complete, and fully convey the concept of the present disclosure to those skilled in the art. Features of the described embodiments may be combined or substituted with each other unless explicitly excluded or should be excluded according to the context.

Unless otherwise defined, technical terms or scientific terms used in this disclosure shall have their ordinary meanings as understood by people with ordinary skills in the field to which the present disclosure belongs. The words "first", "second" and the like used in the present disclosure do not indicate any order, quantity, or importance, but are only used to distinguish different components. Unless otherwise defined, the terms "above", "below", "higher side" and "lower side" used in the present disclosure are all described with respect to the drawings of the present disclosure.

In the drawings, the same reference numbers denote the same or similar structural or functional components, and repeated descriptions about them will be omitted in the following description.

As mentioned above, in order to avoid escalator safety accidents as much as possible, various scenario detection modules are used for safety monitoring or warning of the escalator. These scenario detection modules can be installed in the monitoring apparatus of escalators (for example, image capture apparatus or other apparatus that collect and monitor one or more parameters in the operating environment of escalators) or in the computing equipment associated with the monitoring apparatus in the form of codes, so as to analyze whether it is necessary to give a warning for a potential safety hazard or whether it is necessary to take corresponding measures for the safety accidents that have occurred in real time. However, with the increasing number of scenario detection modules, the simultaneous execution of all scenario detection modules poses great challenges to the computing capability of the monitoring apparatus.

Embodiments of the present disclosure provide a method for setting the state of the scenario detection module for escalator, which can select and execute a part of the scenario detection modules without increasing the computing capability of the monitoring apparatus so that the escalator can still be comprehensively monitored under the condition that the computing capability of the monitoring apparatus is not enough to perform all the scenario detection.

Figure 1:
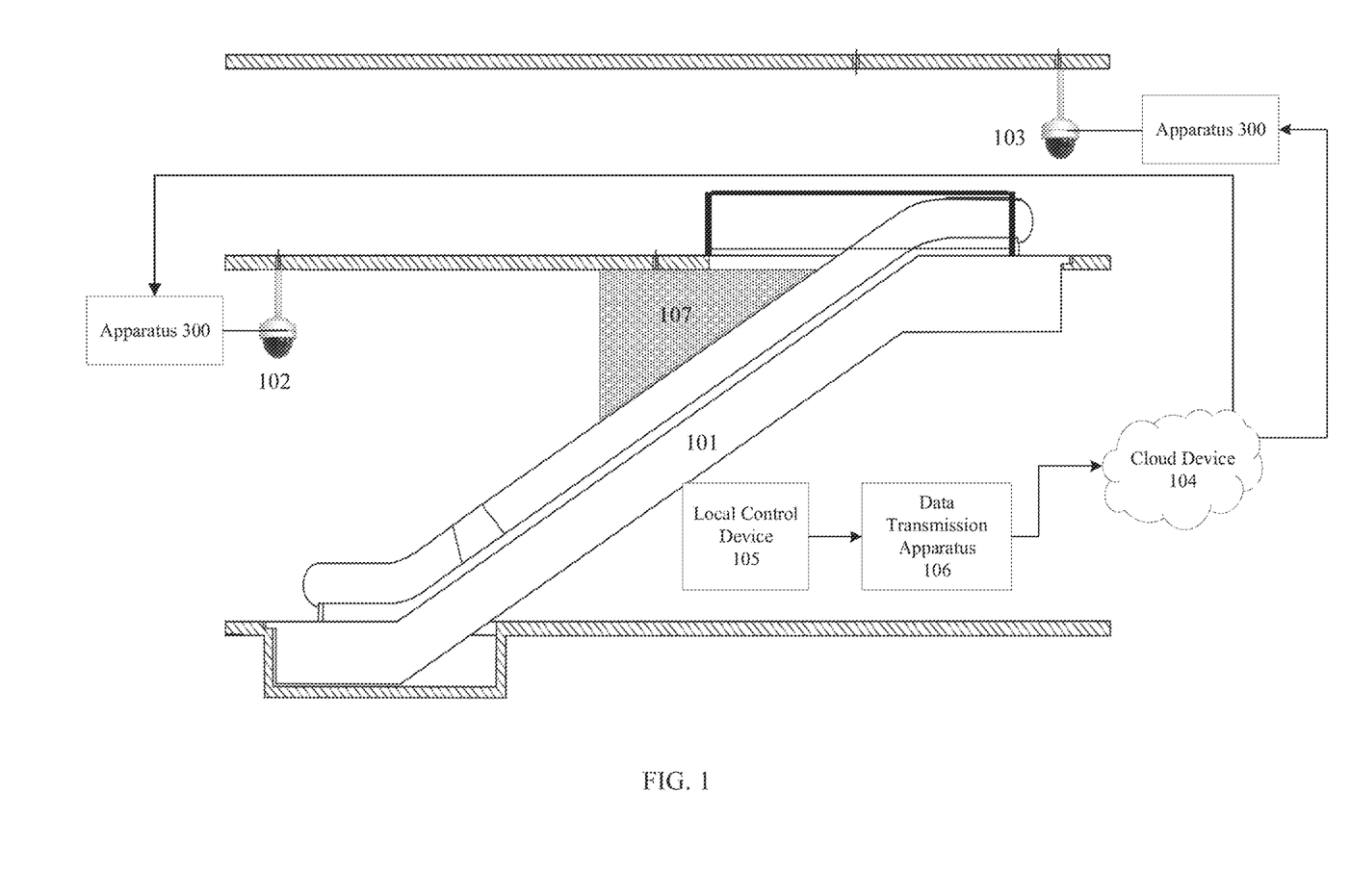
FIG. 1 is a schematic diagram of a usage scenario according to an exemplary embodiment of the present disclosure.

FIG. 1 is a schematic diagram of a usage scenario according to an exemplary embodiment of the present disclosure.

Referring to FIG. 1, an escalator 101 is installed somewhere in a certain daily life scenario (such as a subway station, station, shopping mall, office building, etc.). Above the escalator 101, two monitoring apparatuses 102 and 103 are installed to monitor the escalator 101, which may, for example, capture the running situation of the escalator 101 itself (including the situation of passengers or articles on the escalator 101) and its surrounding environment (including the environment around the location of the escalator 101 in the building). The monitoring range of the monitoring apparatuses 102 and 103 may cover part or all of the escalator 101. As an example, the monitoring apparatus 102 can be installed above the lower side of the escalator 101 to shoot the escalator 101 from the bottom, and the monitoring apparatus 103 can be installed above the higher side of the escalator 101 to shoot the escalator 101 from the top.

In order to comprehensively monitor the safety of the escalator 101, it is desirable to perform N scenario detections with different detection objects or functions on the escalator 101. The N scenario detections correspond to the N scenario detection modules $U_1$ to $U_N$ of the set of scenario detection modules $U=\{U_1, U_2, \ldots, U_N\}$ respectively. However, in some cases, the computing capability of the monitoring apparatus 102 or 103 may only allow at most M scenario detection modules to be executed at the same time, and M<N, or in other cases, although the computing capability of the monitoring apparatus 102 or 103 allows N scenario detection modules to be executed, the computing capability needs to be saved for specific reasons.

The exemplary embodiment of the present disclosure aims to select some scenario detection modules of the set of scenario detection modules $U=\{U_1, U_2, \ldots, U_N\}$ without increasing the computing capability of the monitoring apparatuses 102 and 103, so that the monitoring apparatus 102 or 103 with insufficient computing capability can still comprehensively monitor the escalator 101. As shown in FIG. 1, a method 200 for setting the state of an escalator's scenario detection module according to an exemplary embodiment of the present disclosure can be applied to monitoring apparatuses 102 and 103, or a device 300 for setting the state of an escalator's scenario detection module according to an exemplary embodiment of the present disclosure can be included in or coupled with the monitoring apparatuses 102 and 103, so that the monitoring apparatuses 102 and 103 can set respective scenario detection modules in the set U of the scenario detection modules according to the technical scheme of the present disclosure.

Hereinafter, a method for setting the state of the scenario detection module for an escalator according to an exemplary embodiment of the present disclosure will be described in detail with reference to FIGS. 1 and 2.

Figure 2:
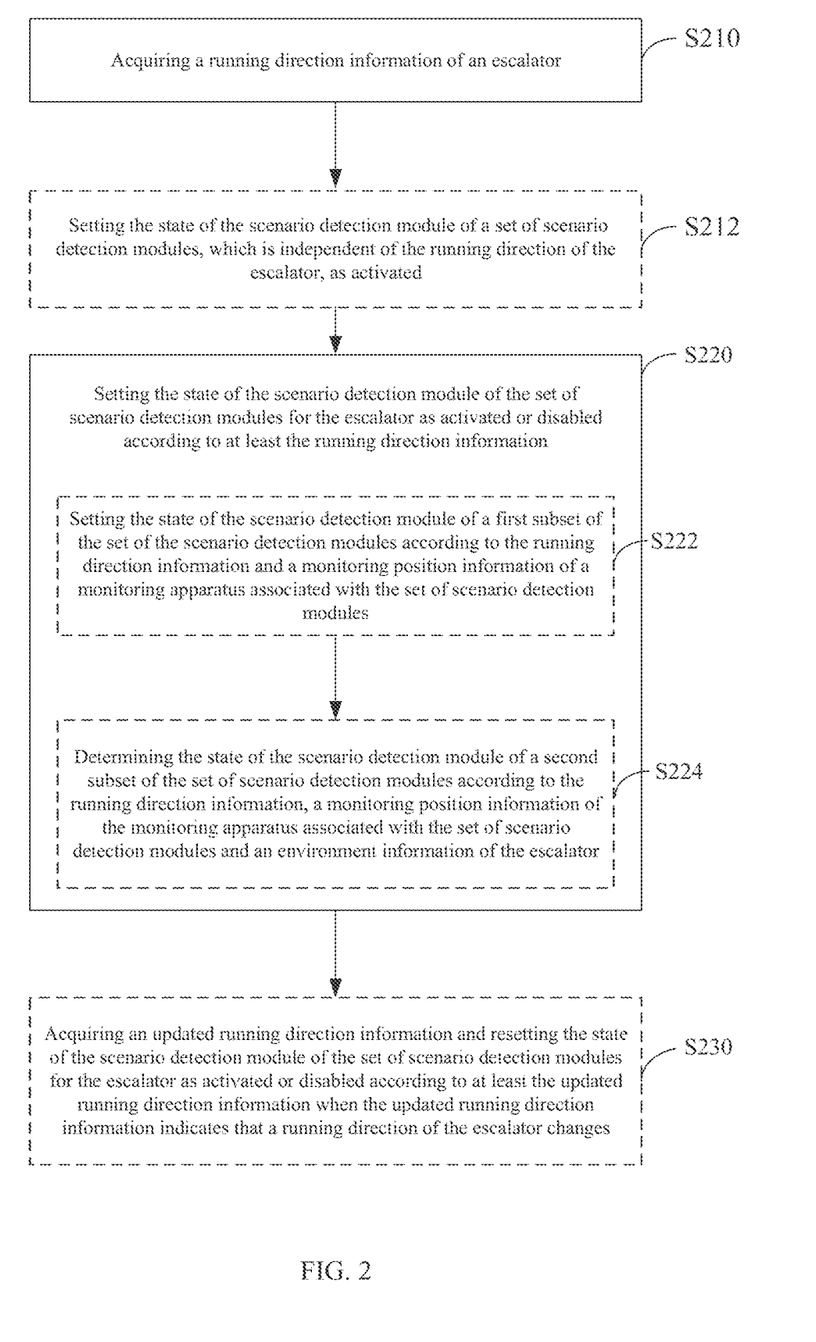
FIG. 2 is a schematic flowchart of a method for setting the state of a scenario detection module for an escalator according to an exemplary embodiment of the present disclosure.

FIG. 2 is a schematic flowchart of a method 200 for setting the state of the scenario detection module for an escalator 101 according to an exemplary embodiment of the present disclosure. The method 200 can be applied to the monitoring apparatus 102 or 103 to set the state of the scenario detection modules of the set U of scenario detection modules. Referring to FIG. 2, in one embodiment, the method 200 may include steps S210 and S220.

At step S210, the running direction information of the escalator 101 is obtained, which indicates whether the escalator 101 is running upward or downward.

As an example, the running direction information of the escalator 101 can be obtained from the cloud device 104 associated with the escalator 101 shown in FIG. 1. The cloud device 104 can be, for example, KONE 24/7 IoT Cloud of KONE Company, which can collect and store the operation data (such as running direction, running speed, start and stop times, etc.) of all escalators associated with it by using Internet of Things (IOT) technology for subsequent query. The local control device 105 installed under the escalator 101 may control the running state of the escalator 101 in real time, such as starting or stopping, running up or down, deceleration or accelerating etc., therefore, data related to the running direction information of the escalator 101 can be queried therein. The data transmission device 106 shown in FIG. 1 is a device that has network transmission function and can be installed inside or outside and coupled with the local control device 105. The data transmission device 106 directly reads the data associated with the running direction information of the escalator 101 from the local control device 105 and transmits the running direction information to the cloud device 104 via its communication link with the cloud device 104.

As another example (not shown in FIG. 1), without or without considering the cloud device 104, the data transmission device 106 directly reads the data associated with the running direction information of the escalator 101 from the local control device 105, and transmits the running direction information to the monitoring apparatus 102 or 103 via its communication link with the monitoring apparatus 102 or 103 (when the monitoring apparatus includes the device 300) or transmits the running direction information to device 300 via its communication link with the device 300 (when the monitoring apparatuses 102 and 103 do not include the device 300).

At step S220, the state of the scenario detection modules of the set U of scenario detection module for the escalator 101 are set to be activated or disabled at least according to the running direction information acquired at step S210.

The set U of scenario detection module containing N scenario detection modules is configured in the monitoring apparatus 102 or 103, but not all the scenario detection modules in the set U need to be executed during the operation of the escalator 101. Depending on the running direction of the escalator 101, only a part of the scenario detection modules in the set U may need to be executed. For convenience of explanation, the following example is assumed. The set U includes scenario detection modules $U_1$ to $U_6$. $U_1$ is an empty escalator module for detecting whether the escalator 101 is empty. $U_2$ is a falling down module for detecting whether any passenger has fallen down on the escalator 101. $U_3$ is an out of handrail module for detecting whether any passenger's head or hand is stretched out of handrail of the escalator 101. $U_4$ is a wrong direction module for detecting whether any passenger is retrograde on the escalator 101. $U_5$ is a baby stroller module for detecting whether any passenger is carrying a baby stroller. $U_6$ is a big luggage module for detecting whether any passenger is carrying a big luggage. The computing capability of at least one of the monitoring apparatus 102 or 103 is M<6, for example, M=5. M=4, etc., or at least one of the monitoring apparatus 102 or 103 needs to save its computing capability for certain reasons although its computing capability is enough to run six scenario detection modules.

According to one embodiment of the present disclosure, the running direction information of the escalator 101 is taken as the first factor (Factor 1) considered when setting the state of the scenario detection module in the set U. Explaining with the above example, for the monitoring apparatus 102 or 103, the state of each scenario detection module in the set U can be set as shown in Table 1.

TABLE 1

| Factor 1 | $U_1$ empty escalator | $U_2$ falling down | $U_3$ out of handrail | $U_4$ wrong direction | $U_5$ baby stroller | $U_6$ big luggage |
|---|---|---|---|---|---|---|
| Run upward | activated | activated | activated | activated | activated | activated |
| Run downward | activated | activated | disabled | activated | activated | activated |

As shown in Table 1, the scenario detection module $U_3$ out of handrail only needs to be executed when the escalator 101 runs upward and does not need to be executed when the escalator 101 runs downward. The reason is that there is usually a triangular area 107 as shown in FIG. 1 on both sides or one side of the escalator 101. When the escalator 101 runs upward, if the passenger stretches his head or hand out of the handrail belt, his head or hand may then be stuck in the triangular area 107. When the escalator runs downward, even if the passenger sticks his head or hand out of the handrail, his head or hand will not be stuck in the triangular area 107. Therefore, the scenario detection module $U_3$ out of handrail can be set to be activated only when the escalator 101 runs upward and set to be disabled when the escalator runs downward. Since it is necessary to detect whether the escalator 101 is empty, whether a passenger falls down, whether a passenger is retrograde, and whether a passenger is carrying a stroller or bia luggage, the states of other scenario detection modules $U_1$ empty escalator, $U_2$ falling down, $U_4$ wrong direction, $U_5$ baby stroller and $U_6$ big luggage are set to be activated in both cases.

In this way, for the monitoring apparatus 102 or 103, the states of each scenario detection modules $U_1$ to $U_6$ in the set U of scenario detection modules are set as shown in Table 1. Even if the computing capability of the monitoring apparatus 102 or 103 is M=5, it can be used to comprehensively monitor the downward running escalator 101.

Thus, the method 200 according to an embodiment of the present disclosure takes the running direction information of the escalator 101 as a factor to set the state of each scenario detection module of the set U of scenario detection modules for the escalator, so that the computing capability of the monitoring apparatus 102 or 103 can be saved, and the monitoring apparatus 102 or 103 with insufficient computing capability to execute all the scenario detection modules in the set U can avoid executing unnecessary scenario detection modules, and thus it can also be used for comprehensively monitoring the escalator 101.

Additionally, in the embodiment, in addition to steps S210 and S220, the method 200 may further include step S212 executed before step S220. At step S212, the state of the scenario detection modules of the set U, which is independent of the running direction of the escalator 101, are set as activated.

$U_{sub1}$ is set to activated or disabled is related to the running direction of the escalator 101 and the monitoring position information of the monitoring apparatus 102 or 103.

Explaining with the above example, considering the running direction information of the escalator 101 (Factor 1) and the monitoring position information of the monitoring apparatus 102 or 103 (Factor 2), the state of each scenario detection module of the set U of scenario detection modules can be set as shown in Table 2.

TABLE 2

| Factor 1 | Factor 2 | $U_1$ empty escalator | $U_2$ falling down | $U_3$ out of handrail | $U_4$ wrong direction | $U_5$ baby stroller | $U_6$ big luggage |
|---|---|---|---|---|---|---|---|
| Run upward | Lower side (monitoring apparatus 102) | activated | activated | disabled | disabled | activated | activated |
| Run upward | Higher side (monitoring apparatus 103) | activated | activated | activated | activated | disabled | disabled |
| Run downward | Lower side (monitoring apparatus 102) | activated | activated | disabled | activated | disabled | disabled |
| Run downward | Higher side (monitoring apparatus 103) | activated | activated | disabled | disabled | activated | activated |

Explaining with the above example, it can be noted that it is necessary to monitor whether the escalator 101 is empty or not and whether any passenger has fallen down on the escalator, so whether $U_1$ empty escalator and $U_2$ falling down are activated or not has nothing to do with the direction of the escalator 101. In other words, $U_1$ and $U_2$ belong to the scenario detection module that is activated by default. Therefore, it is possible to set the states of $U_1$ and $U_2$ to active before step S220, thereby the calculation amount required for step S220 is reduced.

According to another embodiment of the present disclosure, in addition to the running direction information of the escalator 101, the monitoring position information of the monitoring apparatus 102 or 103 can also be used as the second factor (Factor 2) for setting the state of the scenario detection module in the set U. This monitoring position information refers to information that can indicate whether the monitoring object of the monitoring apparatus 102 or 103 is the entrance or exit of the escalator 101 when it is combined with the running direction information of the escalator 101. For example, referring to FIG. 1, the monitoring position information of the monitoring apparatus 102 can be information indicating that it is located at the lower side of the escalator 101. When the escalator 101 runs upward, it can be deduced that the monitoring object of the monitoring apparatus 102 is the entrance of the escalator 101. When the escalator 101 runs downward, it can be deduced that the monitoring object of the monitoring apparatus 102 is the exit of the escalator 101. In another embodiment, the above step S220 may include a sub-step S222. In the sub-step S222, the state of the scenario detection modules in the first subset $U_{sub1}$ of the set U of scenario detection modules are set according to the running direction information of the escalator 101 and the monitoring position information of the monitoring apparatus 102 or 103. Whether the scenario detection module of the first subset It can be seen that in Table 2, the state settings of the scenario detection modules $U_3$ out of handrail, $U_4$ wrong direction, $U_5$ baby stroller and $U_6$ big luggage are different from those in Table 1.

For the scenario detection module $U_3$ out of handrail, the following scenario should be understood. The triangular area 107 normally appears near the middle of the escalator 101. As the escalator 101 is running upward, before the passenger enters the escalator and reaches the middle of the escalator, even if the passenger stretches his head or hand out of the handrail, his head or hand will not get stuck in the triangular area 107. As the passenger continues to run upward from the middle of the escalator, it is very likely that his head or hand will get stuck in the triangular area 107 if he stretches his head or hand out of the handrail. Therefore, in case that the escalator 101 is running upward, only the monitoring apparatus 103 located on the higher side for monitoring the escalator exit needs to execute the module $U_3$, and the monitoring apparatus 102 located on the lower side for monitoring the escalator entrance does not need to execute the scenario detection module $U_3$. In other words, when considering both the running direction information of the escalator 101 (Factor 1) and the monitoring position information of the monitoring apparatus 102 or 103 (Factor 2) at the same time, the state of the scenario detection module $U_3$ can be set to be disabled for the monitoring apparatus 102 and activated for the monitoring apparatus 103, as shown in Table 2.

For the scenario detection modules $U_5$ baby stroller and $U_6$ big luggage, the following scenario should be understood. Once it is detected that any passenger is carrying a stroller and big luggage at the entrance of the escalator 101, the passenger is reminded that he should take the elevator instead of the escalator, so these detections are no longer needed at the exit of the escalator 101. Referring to FIG. 1, when the escalator 101 is running upward, the monitoring apparatus 102 is used to monitor the entrance of the escalator 101 and the monitoring apparatus 103 is used to monitor the exit of the escalator 101. At this time, it may be optional for only the scenario detection modules $U_5$ and $U_6$ to be executed in the monitoring apparatus 102. Similarly, when the escalator 101 is running downward, the monitoring apparatus 103 is used to monitor the entrance of the escalator 101 and the monitoring apparatus 102 is used to monitor the exit of the escalator 101. At this time, it may be optional for only the scenario detection modules $U_5$ and $U_6$ to be executed in the monitoring apparatus 103. In other words, when considering both the running direction information (Factor 1) of the escalator 101 and the monitoring position information (Factor 2) of the monitoring apparatus 102 or 103 at the same time, the states of the scenario detection modules $U_5$ and $U_6$ are set to be activated only for the monitoring apparatus 102 if the running direction information indicates that the escalator 101 is running upward, and the scenario detection modules $U_5$ and $U_6$ are set to be activated only for the monitoring apparatus 103 if the running direction information indicates that the escalator 101 is running downward.

For module $U_4$ wrong direction, the following scenario should be understood. Retrograde on escalator 101 may cause passengers to lose their balance, resulting in safety accidents such as falling down, or fingers being pinched by handrails. However, retrograde indicates that the passenger boarded the escalator at the exit, so it is only necessary to carry out retrograde detection at the exit. Referring to FIG. 1, when the escalator 101 is running upward, the monitoring apparatus 102 is used to monitor the entrance of the escalator 101 and the monitoring apparatus 103 is used to monitor the exit of the escalator 101. At this time, it may be optional for only the scenario detection module $U_4$ to be executed in the monitoring apparatus 103. Similarly, when the escalator 101 is running downward, the monitoring apparatus 103 is used to monitor the entrance of the escalator 101 and the monitoring apparatus 102 is used to monitor the exit of the escalator 101. At this time, it may be optional for only the scenario detection module $U_4$ to be executed in the monitoring apparatus 102. In other words, when considering both the running direction information of the escalator 101 (Factor 1) and the monitoring position information of the monitoring apparatus 102 or 103 (Factor 2), the state of the scenario detection module $U_4$ is set to be activated only for the monitoring apparatus 103 if the running direction information indicates that the escalator 101 is running upward, and the state of the scenario detection module $U_4$ is set to be activated only for the monitoring apparatus 102 if the running direction information indicates that the escalator 101 is running downward, as shown in Table 2.

In this example, the first subset $U_{sub1}$ of the set U of the scenario detection module={$U_4$, $U_5$, $U_6$}, and the states of each scenario detection module $U_4$, $U_5$, $U_6$ in the first subset $U_{sub1}$ can be determined according to the running direction information of the escalator and the monitoring position information of the monitoring apparatus 102 or 103.

Thus, the method 200 according to another embodiment of the present disclosure takes both the running direction information of the escalator 101 and the monitoring position information of the monitoring apparatus as factors for setting the state of the scenario detection module in the set U of the scenario detection module in the monitoring apparatus 102 or 103, so that the computing capability of the monitoring apparatus 102 or 103 can be further saved, and the monitoring apparatus 102 or 103 with insufficient computing capability to execute all the scenario detection modules of the set U of the scenario detection module can further avoid executing unnecessary scenario detection modules, thereby it can still be used for comprehensive monitoring of escalators.

According to another embodiment of the present disclosure, in addition to the running direction information of the escalator 101 and the monitoring position information of the monitoring apparatus 102 or 103, the environmental information of the escalator 101 can be taken as the third factor (Factor 3) for setting the state of the scenario detection module. The environmental information refers to the information related to the surrounding environment of the location of the escalator 101 in the building that can affect whether the scenario detection module is activated or not. For example, the environmental information may be information indicating whether there is a triangular area (such as the triangular area 107 shown in FIG. 1) on both sides or one side of the escalator 101. In this further embodiment, the above step S220 may include a sub-step S224. In sub-step S224, the states of the scenario detection modules in the second subset $U_{sub2}$ of the set U of the scenario detection module are set according to the running direction information of the escalator 101, the monitoring position information of the monitoring apparatus 102 or 103 and the environmental information of the escalator 101. The state of each scenario detection module in the second subset $U_{sub2}$ is related to the running direction information of the escalator 101, the monitoring position information of the monitoring apparatus 101 or 102 and the environmental information of the escalator 101.

Explaining with the above example, considering the running direction information (Factor 1) of the escalator 101, the monitoring position information (Factor 2) of the monitoring apparatus 102 or 103 and the environmental information (Factor 3) of the escalator 101, the state of each scenario detection module of the set U of the scenario detection module can be set as shown in Table 3.

TABLE 3

| Factor 1 | Factor 2 | Factor 3 | $U_1$ empty escalator | $U_2$ falling down | $U_3$ out of handrail | $U_4$ wrong direction | $U_5$ baby stroller | $U_6$ big luggage |
| --- | --- | --- | --- | --- | --- | --- | --- | --- |
| Run upward | Lower side (monitoring apparatus 102) | with triangular area | activated | activated | disabled | disabled | activated | activated |
| Run upward | Higher side (monitoring apparatus 103) | with triangular area | activated | activated | activated | activate | disabled | disabled |

TABLE 3-continued

| Factor 1 | Factor 2 | Factor 3 | $U_1$ empty escalator | $U_2$ falling down | $U_3$ out of handrail | $U_4$ wrong direction | $U_5$ baby stroller | $U_6$ big luggage |
|---|---|---|---|---|---|---|---|---|
| Run downward | Lower side (monitoring apparatus 102) | with triangular area | activated | activated | disabled | activate | disabled | disabled |
| Run downward | Higher side (monitoring apparatus 103) | with triangular area | activated | activated | disabled | disabled | activated | activated |
| Run upward | Lower side (monitoring apparatus 102) | without triangular area | activated | activated | disabled | disabled | activated | activated |
| Run upward | Higher side (monitoring apparatus 103) | without triangular area | activated | activated | disabled | activate | disabled | disabled |
| Run downward | Lower side (monitoring apparatus 102) | without triangular area | activated | activated | disabled | activate | disabled | disabled |
| Run downward | Higher side (monitoring apparatus 103) | without triangular area | activated | activated | disabled | disabled | activated | activated |

It can be seen that in Table 3, the state of the scenario detection module $U_3$ out of handrail is different from that in Tables 1 and 2.

For the scenario detection module $U_3$ out of handrail, combined with FIG. 1, the following scenario should be understood. When the escalator 101 is located in a building so that there is no triangular area on both sides of the escalator 101 or there is a triangular area but it is far away from it, even if the passenger stretches his head or hand out of the handrail when the escalator 101 is running upward, it is impossible to get his head or hand stuck. At this time, we can choose not to execute the module $U_3$. In other words, when all the running direction information (Factor 1) of the escalator 101, the monitoring position information (Factor 2) of the monitoring apparatus 102 or 103 and the environmental information (Factor 3) of the escalator 101 are considered at the same time, the scenario detection module $U_3$ is activated in the monitoring apparatus 103 only when the environmental information of the escalator 101 indicates that a safety accident corresponding to $U_3$ may occur and the running direction information of the escalator indicates that the escalator 101 is running upward.

In this example, the second subset $U_{sub2}=\{U_2\}$, and the state of each scenario detection module in the second subset can be set according to the running direction information of the escalator 101, the monitoring position information of the monitoring apparatus 102 or 103 and the environmental information of the escalator.

It should be noted that in this further embodiment, taking the information indicating whether there is a triangle as the environmental information of the escalator 101 is only exemplified for the scenario detection module $U_3$ out of handrail, which is not a limitation of the present disclosure, and other environmental information of the escalator that can affect whether it is necessary to activate a certain scenario detection module is also possible.

Thus, the method 200 according to another embodiment of the present disclosure takes the running direction information of the escalator 101, the monitoring position information of the monitoring apparatus 102 or 103 and the environment information of the escalator 101 as three factors for setting the state of the scenario detection module of the set U of the scenario detection module in the monitoring apparatus 102 or 103, so that the computing capability of the monitoring apparatus 102 or 103 can be further saved. It also makes the monitoring apparatus 102 or 103 whose computing capability is not enough to execute all the scenario detection modules of the set U further avoid executing unnecessary scenario detection modules and remove more computational redundancy, so that it can still be used to comprehensively monitor the escalator 101.

It should be noted that in the foregoing embodiments, the monitoring apparatus 102 is described as located at the lower side of the escalator 101, and the monitoring apparatus 103 is described as located at the higher side of the escalator 101 for the purpose of illustration only and is not a limitation of the present disclosure. Other information that can indicate whether the monitoring object of the monitoring apparatus 102 or 103 is the entrance or exit of the escalator 101 when combined with the running direction information of the escalator 101 is also possible.

Additionally, the method 200 may further include step S230. In step S230, acquiring an updated running direction information and resetting the state of the scenario detection module of the set U of the scenario detection module for the escalator 101 as activated or disabled according to at least the updated running direction information when the updated running direction information indicates that a running direction of the escalator 101 changes.

In some examples, the running direction of the escalator 101 can be changed through the control of the local control equipment 105. For example, for the escalator 101 in an office building, considering that the purpose of most passengers is to go upstairs during the morning rush hour, in order to improve the transportation efficiency, the escalator that originally runs downward can be adjusted to run upward. In the same way, considering that the purpose of most passengers during the evening rush hour is to go downstairs, the escalator 101 that originally ran upward can also be adjusted to run downward. In this case, the updated running direction information can be obtained within a certain period of time (for example, the running direction of the escalator 101 will only change in a certain period of time, for example, in the morning or evening rush hours) or at a certain time interval (for example, the running direction of the escalator 101 may change randomly). When the updated running direction information indicates that the running direction of the escalator 101 changes, resetting the state of the scenario detection module of the set U of the scenario detection module for the escalator 101 to be activated or disabled at least according to the updated running direction information can be performed according to the method described in connection with various embodiments.

Additionally, if the set U of the scenario detection module contains the default activated scenario detection modules (as mentioned above), the resetting step can eliminate the setting of the states of these default activated scenario detection modules, thereby reducing the amount of calculation required for executing step S230.

Therefore, the state of the scenario detection module can be changed with the change of the running direction of the escalator 101, and the computing capability of the monitoring apparatus 102 or 103 is always saved as much as possible, and the monitoring apparatus 102 or 103 is always kept from executing unnecessary scenario detection modules, so that the escalator can still be comprehensive monitored when its computing capability is not enough to execute all the scenario detection modules of the set U of the scenario detection module. Furthermore, in the process of resetting, the setting of the scenario detection module irrelevant to the running direction can be excluded, thus reducing the calculation amount.

Hereinafter, an apparatus for setting the state of a scenario detection module for an escalator according to an exemplary embodiment of the present disclosure will be described with reference to FIGS. 1 and 3.

Figure 3:
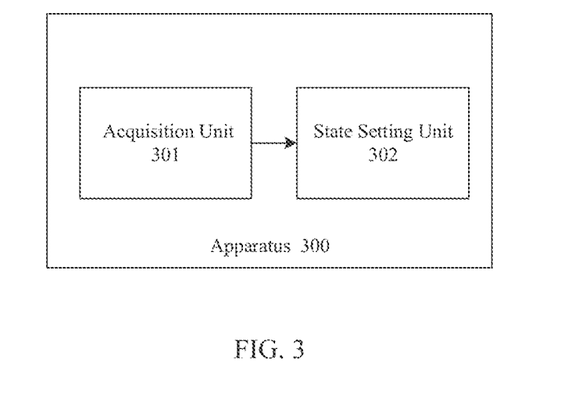
FIG. 3 is a schematic block diagram of an apparatus for setting the state of a scenario detection module for an escalator according to an exemplary embodiment of the present disclosure.

FIG. 3 is a schematic block diagram of an apparatus 300 for setting the state of a scenario detection module for an escalator according to an exemplary embodiment of the present disclosure. As shown in FIG. 3, the apparatus 300 includes an acquisition unit 301 and a state setting unit 302. The apparatus 300 may be installed inside the monitoring apparatus 102 or 103 or installed outside and coupled with the monitoring apparatus 102 or 103 as shown in FIG. 1.

The acquisition unit 301 is configured to acquire running direction information of the escalator 101. Referring to FIG. 1, as an example, the acquisition unit 301 may acquire the running direction information of the escalator 101 from the cloud device 104 associated with the escalator 101 (for example, the cloud device KONE24/7 IoT cloud of Kone Company). In the example, the data transmission device 106 coupled with the local control device 105 of the escalator 101 can directly read the running direction information of the escalator 101 from the local control device 105, and then transmit the running direction information to the cloud device 104 for the acquisition unit 301 to request and acquire. As another example, the data transmission device 106 can also directly transmit the read running direction information to the acquisition unit 301 of the device 300 without or without considering the cloud device 104.

According to an embodiment of the present disclosure, the state setting unit 302 is configured to set the states of the scenario detection modules $U_1$ to $U_N$ of the set $U=\{U_1, U_2, \ldots, U_N\}$ of the scenario detection module for the escalator 101 to be activated or disabled at least according to the running direction information of the escalator 101. In view of the fact that the principle and process of setting the state of the scenario detection module according to the running direction information (Factor 1) have been described in detail in combination with FIG. 1 and FIG. 2, it is omitted here for avoiding repetition.

According to another embodiment of the present disclosure, the state setting unit 302 is further configured to determine the state of the scenario detection module of the first subset $U_{sub1}$ of the module set U according to both the running direction information of the escalator 101 and the monitoring position information of the monitoring apparatus 102 or 103. Whether each scenario detection module of the first subset $U_{sub1}$ should be activated or not is related to the running direction of the escalator 101 and the monitoring position information of the monitoring apparatus 102 or 103, such as $U_{sub1}=\{U_3, U_4, U_5, U_6\}$. In view of the fact that the principle and process of setting the state of the scenario detection module in the first subset $U_{sub1}$ according to both the running direction information (Factor 1) of the escalator 101 and the monitoring position information (Factor 2) of the monitoring apparatus 102 or 103 have been described in detail in connection with FIG. 1 and FIG. 2, it is omitted here for avoiding repetition.

According to another embodiment of the present disclosure, the state setting unit 302 is further configured to set the state of the scenario detection modules of the second subset $U_{sub2}$ (e.g., $U_{sub2}=\{U_3\}$) of the set U of the scenario detection module according to the running direction information of the escalator 101, the monitoring position information of the monitoring apparatus 102 or 103 and the environmental information of the escalator 101. In view of the fact that the principle and process of determining the state of the scenario detection module in the second subset $U_{sub2}$ according to the running direction information (Factor 1) of the escalator 101, the monitoring position information (Factor 2) of the monitoring apparatus 102 or 103 and the environmental information (Factor 3) of the escalator 101 have been described in detail in combination with FIG. 1 and FIG. 2, it is omitted here for avoiding repetition.

Additionally, when the set U of the scenario detection module contains scenario detection modules that are activated by default and regardless of the running direction of the escalator 101 (for example, the aforementioned $U_1$ and $U_2$), the state setting unit 302 can also be configured to directly set the state of such scenario detection modules as activated without performing the steps of setting their states according to at least one of the above Factors 1 to 3, thereby reducing the amount of calculation required by the state setting unit 302.

Thus, the apparatus 300 for setting the state of the scenario detection module for the escalator according to the exemplary embodiment of the present disclosure takes at least one of the running direction information of the escalator 101, the monitoring position information of the monitoring apparatus 102 or 103 and the environmental information of the escalator 101 as a factor for setting the state of the scenario detection module of the set U of the scenario detection module for the monitoring apparatus 102 or 103, so that the monitoring apparatus 102 or 103 can save computing capability and the monitoring apparatus 102 or 103 with insufficient computing capability to execute all the scenario detection modules of the set U can avoid executing unnecessary modules and can still be used for early warning of comprehensive monitoring of the escalator 101.

Additionally, the state setting unit 302 is also configured to acquire updated running direction information, and when the updated running direction information indicates that the running direction of the escalator 101 is changed, the state of the scenario detection module of the set U of the scenario detection module for the escalator 101 is reset to be activated or disabled at least according to the updated running direction information. Moreover, if the set U of the scenario detection module contains the scenario detection modules activated by default (such as the aforementioned $U_1$ and $U_2$), the resetting can only be performed on the scenario detection modules except the scenario detection modules activated by default, thus reducing the calculation amount required by the state setting unit 302.

Thus, the state setting unit 300 according to the exemplary embodiment of the present disclosure can update the states of the scenario detection modules of the set U of the scenario detection module according to the change of the running direction of the escalator 101. And additionally, the update can only be performed on the scenario detection module except the scenario detection module activated by default, so that the calculation amount required by the state setting unit 302 can be reduced.

Figure 4:
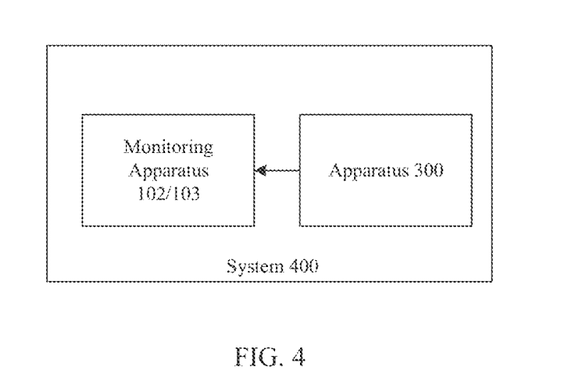
FIG. 4 is a schematic block diagram of a system including scenario detection for an escalator according to an exemplary embodiment of the present disclosure.

FIG. 4 is a schematic block diagram of a system 400 for performing scenario detection on an escalator according to an exemplary embodiment of the present disclosure.

As shown in FIG. 4, a system 400 for performing scenario detection on an escalator may include the aforementioned monitoring apparatus 102 and/or monitoring apparatus 103 and an apparatus 300 for setting the state of the scenario detection module for the escalator. The monitoring apparatus 102 and/or 103 store a set $U=\{U_1, U_2, \ldots, U_N\}$ of scenario detection modules, and set the states of the scenario detection modules of the set U of scenario detection modules via the apparatus 300 to selectively execute one or more of the various scenario detection modules, so that the computing capability of the monitoring apparatus 102 and/or 103 is saved and so that the monitoring apparatus 102 and/or 103 can still be used for comprehensive monitoring of escalators in case that the computing capability of them is insufficient for executing all scenario detection modules of the set U.

It should be noted that although the apparatus 300 is shown as being separated from the monitoring apparatus 102 or 103 in FIG. 4, as mentioned above, the apparatus 300 can also be installed inside the monitoring apparatus 102 or 103.

Figure 5:
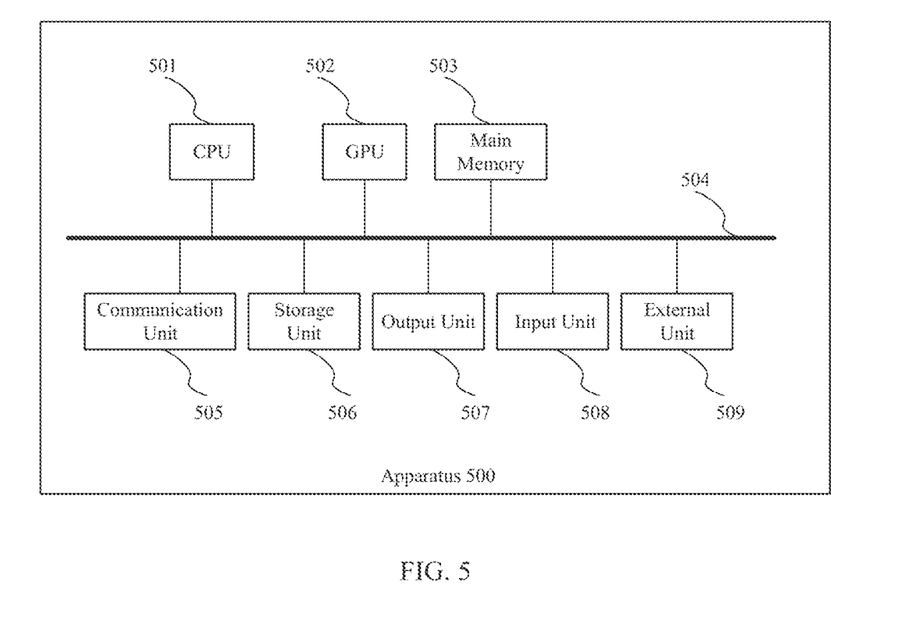
FIG. 5 is a block diagram of a device for setting the state of the scenario detection module for an escalator according to an exemplary embodiment of the present disclosure.

FIG. 5 is a block diagram of a device 500 for setting the state of a scenario detection module for an escalator according to an exemplary embodiment of the present disclosure.

The device 500 for setting the state of the scenario detection module for an escalator according to an embodiment of the present disclosure at least includes a memory for storing computer program instructions and a processor for executing the computer program instructions. When the computer program instructions are loaded and run by the processor, the processor performs the method 200 for setting the state of the scenario detection module for the escalator described above in connection with FIG. 2.

The apparatus 500 shown in FIG. 5 may specifically include a central processing unit (CPU) 501, an image processing unit (GPU) 502, and a main storage unit 503. These units are interconnected by a bus 504. The central processing unit (CPU) 501 and/or the image processing unit (GPU) 502 can be used as the above-mentioned processor, and the main storage unit 503 can be used as the above-mentioned memory for storing computer program instructions. In addition, the device 500 may further include a communication unit 505, a storage unit 506, an output unit 507, an input unit 508 and an external unit 509, which are also connected to the bus 504.

Figure 6:
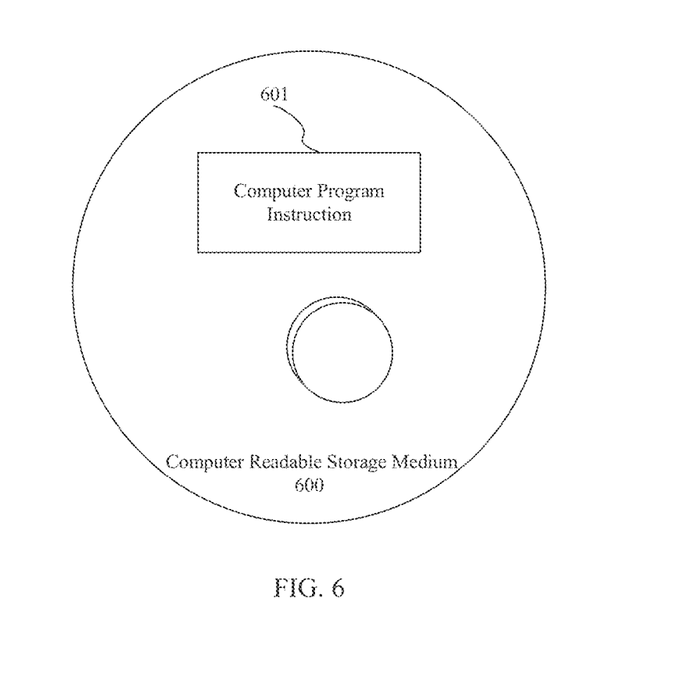
FIG. 6 is a schematic diagram illustrating a computer-readable storage medium according to an exemplary embodiment of the present disclosure.

FIG. 6 is a schematic diagram illustrating a computer-readable storage medium 600 according to an exemplary embodiment of the present disclosure. As shown in FIG. 6, a computer-readable storage medium 600 according to an embodiment of the present disclosure has computer program instructions 601 stored thereon. When the computer program instructions 601 are executed by a processor, the method 200 for setting the state of the scenario detection module for the escalator described above in connection with FIG. 2 is executed.

The computer-readable storage medium 600 includes, but is not limited to, for example, volatile memory and/or nonvolatile memory. The volatile memory may include, for example, random access memory (RAM) and/or cache, etc. The nonvolatile memory may include, for example, a read-only memory (ROM), a hard disk, a flash memory, an optical disk, a magnetic disk, and the like.

Furthermore, the method 200 for setting the state of the scenario detection module of the escalator described above in connection with FIG. 2 can also be implemented by a computer program product, on which computer instructions are stored, and when the computer instructions are executed by a processor, the method 200 is executed.

The method 200 for setting the state of the scenario detection module for the escalator, the apparatus 300 for setting the state of the scenario detection module for the escalator and the system 400 for performing the scenario detection on the escalator according to the embodiment of the present disclosure take at least one of the running direction information of the escalator, the monitoring position information of the monitoring apparatus and the environmental information of the escalator as a factor for setting the state of the scenario detection module, so that the computing capability of the monitoring apparatus can be saved, and the comprehensive monitoring and early warning of the escalator can be realized by the monitoring apparatus with the computing capability that is not enough to execute all modules of the set of modules.

It should be understood by those skilled in the art that the above-mentioned specific embodiments are only examples rather than limitations, and various modifications, combinations, partial combinations and substitutions can be made to the embodiments of the present disclosure according to design requirements and other factors, as long as they are within the scope of the appended claims or their equivalents, that is, they belong to the scope of rights to be protected by the present disclosure.

The invention claimed is:

1. A method for setting a state of a scenario detection module for an escalator, comprising:
    acquiring running direction information of the escalator; and
    for each scenario detection module of a set of scenario detection modules for the escalator, setting the state of the scenario detection module as activated or disabled according to at least the running direction information.

2. The method according to claim 1, wherein for each scenario detection module of the set of scenario detection modules for the escalator, setting the state of the scenario detection module as activated or disabled according to at least the running direction information comprises:
    for each scenario detection module of a first subset of the set of scenario detection modules, setting the state of the scenario detection module as activated or disabled according to the running direction information and monitoring position information of a monitoring apparatus associated with the set of scenario detection modules.

3. The method according to claim 1, wherein for each scenario detection module of the set of scenario detection modules for the escalator, setting the state of the scenario detection module as activated or disabled according to at least the running direction information comprises:
- for each scenario detection module of a second subset of the set of scenario detection modules, setting the state of the scenario detection module as activated or disabled according to the running direction information, monitoring position information of a monitoring apparatus associated with the set of scenario detection modules and environment information of the escalator.

4. The method according to claim 1, further comprising: acquiring updated running direction information; and
- for each scenario detection module of the set of scenario detection modules for the escalator, resetting the state of the scenario detection module as activated or disabled according to at least the updated running direction information when the updated running direction information indicates that a running direction of the escalator changes.

5. The method according to claim 1, wherein the acquiring the running direction information comprises: acquiring the running direction information from a cloud device associated with the escalator, and the running direction information is read from a local control device of the escalator by a data transmission apparatus and then transmitted to the cloud device.

6. The method according to claim 2, wherein the monitoring apparatus is an image capturing apparatus.

7. An apparatus for setting a state of a scenario detection module for an escalator, comprising:
- an acquisition unit, configured to acquire running direction information of the escalator; and
- a state setting unit, configured to, for each scenario detection module of a set of scenario detection modules for the escalator, set the state of the scenario detection module as activated or disabled according to at least the running direction information.

8. The apparatus according to claim 7, wherein the state setting unit is further configured to, set the state of for each scenario detection module of a first subset of the set of scenario detection modules, set the state of the scenario detection module as activated or disabled according to the running direction information and monitoring position information of a monitoring apparatus associated with the set of scenario detection modules.

9. The apparatus according to claim 7, wherein the state setting unit is further configured to, for each scenario detection module of a second subset of the set of scenario detection modules, set the state of the scenario detection module as activated or disabled according to the running direction information, monitoring position information of a monitoring apparatus associated with the set of scenario detection modules and environment information of the escalator.

10. The apparatus according to claim 7, wherein the state setting unit is further configured to acquire updated running direction information, and for each scenario detection module of the set of scenario detection modules for the escalator, reset the state of the scenario detection module as activated or disabled according to at least the updated running direction information when the updated running direction information indicates that a running direction of the escalator changes.

11. A system for scenario detection for an escalator, comprising the apparatus according to claim 7 and a monitoring apparatus associated with a set of scenario detection modules and used to execute the scenario detection modules.

12. A device for setting a state of a scenario detection module for an escalator, comprising:
- a processor; and
- a memory, storing a computer executable program thereon that when executed by the processor causes the device to perform the method according to claim 1.

13. A non-transitory computer readable storage medium storing a computer instruction thereon that when executed by a processor performs the method according to claim 1.

14. A non-transitory computer program product storing a computer instruction thereon that when executed by a processor performs the method according to claim 1.

* * * * *